April 7, 1959   P. G. KAPPUS   2,880,576
SUPERSONIC VARIABLE THROAT NOZZLE
Filed May 25, 1954   3 Sheets-Sheet 1
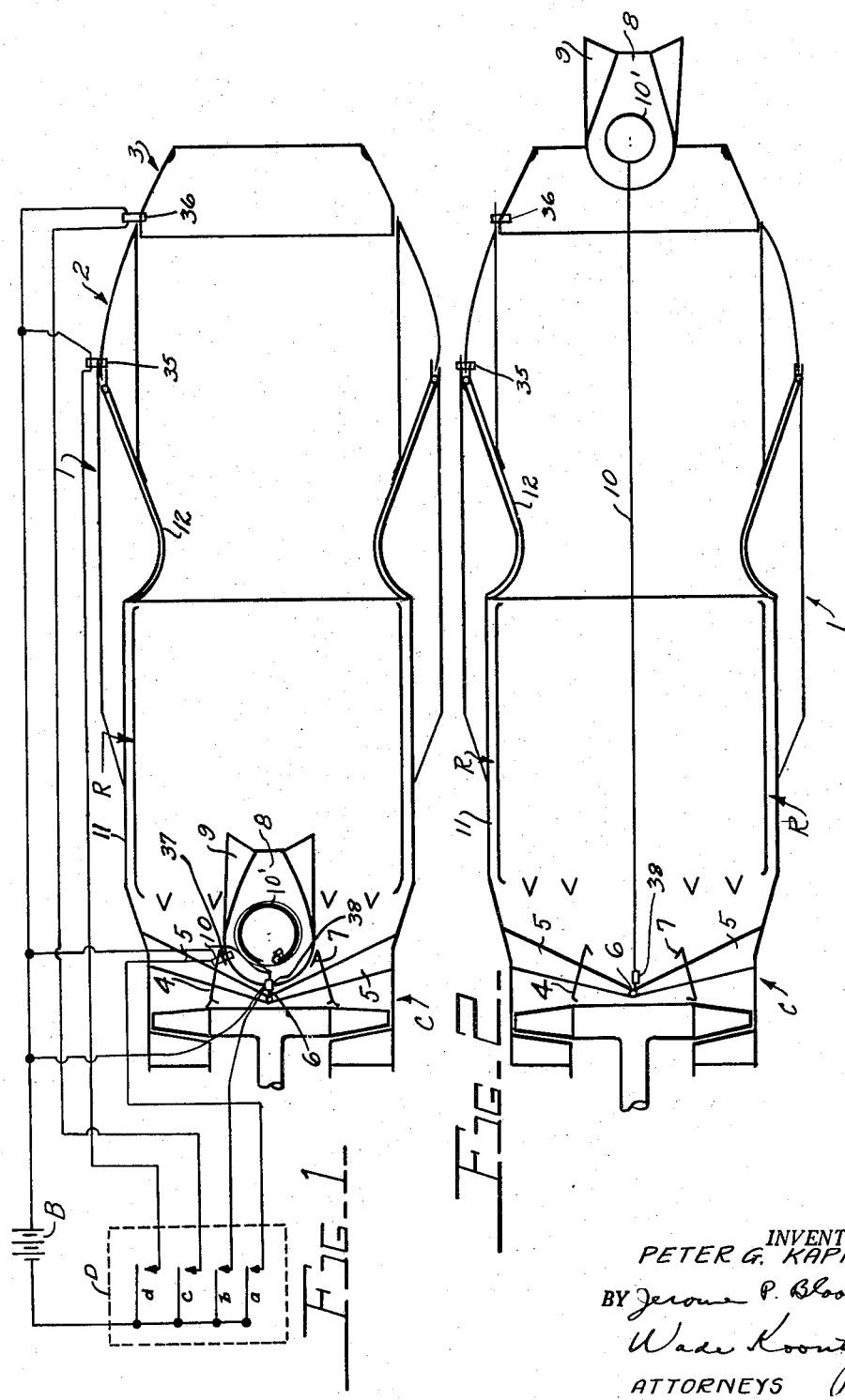
INVENTOR.
PETER G. KAPPUS
BY Jerome P. Bloom
Wade Koontz  AND
ATTORNEYS

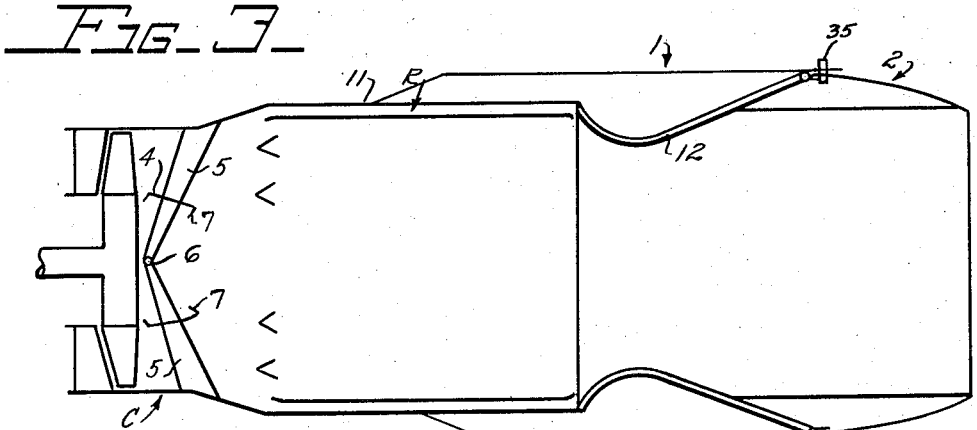
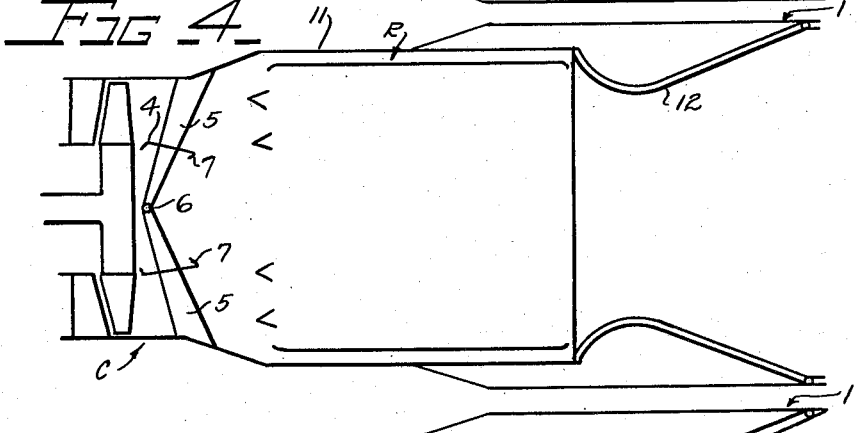
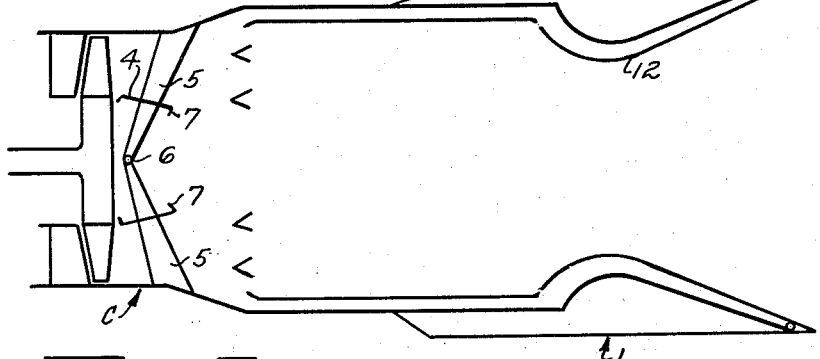

April 7, 1959   P. G. KAPPUS   2,880,576
SUPERSONIC VARIABLE THROAT NOZZLE
Filed May 25, 1954   3 Sheets-Sheet 3

INVENTOR.
PETER G. KAPPUS
BY Jerome P. Bloom
AND
Wade Koonty
ATTORNEYS 2,880,576

SUPERSONIC VARIABLE THROAT NOZZLE

Peter G. Kappus, Dayton, Ohio, assignor to the United States of America as represented by the Secretary of the Air Force Application May 25, 1954, Serial No. 432,338

2 Claims. (Cl. 60—35.6)

(Granted under Title 35, U. S. Code (1952), sec. 266)

The invention described herein may be manufactured and used by or for the United States Government for governmental purposes without payment to me of any royalty thereon.

This invention relates to a new and novel variable throat nozzle for a reaction motor having expendable components such as may be employed in missiles and other airborne vehicles.

In order to achieve optimum engine efficiency in a turbo or ram jet engine aerodynamic considerations require the cross sectional area of the engine exhaust nozzle to be functionally related to the speed of the gases passing through the engine and accordingly to the speed of the aircraft or vehicle, other factors being held constant. Accordingly, when extreme range is required and fuel considerations require the engine to operate at optimum efficiency for the entire trip, the cross sectional area of the engine exhaust nozzle must be continuously varied throughout the entire speed range. Since, however, the speed range may vary from 0 at take-off to Mach numbers of the order of 3 during flight, the required cross sectional area variation of the exhaust nozzle may be quite severe. Mechanisms can be designed to provide this required size variation, but they impose objectionable weight requirements.

This invention provides a means for maintaining an optimal cross sectional area for the engine exhaust nozzle throughout the entire speed range without imposing this objectionable weight penalty. This is accomplished by securing a plurality of connected axially spaced dispensable nozzle elements to the discharge portion of the engine. Each nozzle section provides optimum engine efficiency for a predetermined engine speed starting with the first or outermost nozzle element for low subsonic speeds, and then, in succession, providing optimum efficiency for engine speeds of higher Mach numbers.

To provide optimum engine efficiency for engine speeds intermediate these predetermined speeds for which the nozzle elements are designed, a mechanism is provided to vary the cross sectional area of the nozzle throat. This mechanism is not called upon to provide the entire variation of the cross sectional area of the engine exhaust nozzle required by the total speed range, but instead only has to provide the variation required between axially adjacent nozzle elements. For this reason, the mechanism can be made substantially smaller than those which have to provide a variation suitable for the entire speed range. This mechanism cooperating with the outermost nozzle element attached to the engine, continuously controls the cross sectional area of the nozzle throat, to provide optimum engine efficiency in the speed ranges intermediate the predetermined engine speeds corresponding to axially adjacent nozzle elements.

The subject invention eliminates the prior art complex and bulky mechanical devices heretofore employed to effect controlled jet nozzle areas introducing a simple inexpensive control apparatus having the highest degree of efficiency to provide the necessary jet nozzle area as desired throughout the range of required performance.

Moreover, the novel employment of expendable jet nozzle components ejectable in flight after their purpose has been effected eliminates the possibility of any chance mishap in the control functions of the jet nozzle where they are employed.

The invention further incorporates an improved novel integral control apparatus capable of functioning to control the cross sectional area of a convergent-divergent nozzle.

The particular advantages and novelty of the invention will become readily apparent to those versed in the art from the following description of a practical embodiment of the invention.

An object of this invention is to provide a new and improved supersonic variable throat nozzle.

A further object of this invention is to provide an improved apparatus for variably controlling the throat area of a jet nozzle.

Another object of the invention is to provide a novel supersonic jet nozzle employing expendable ejectable parts which are ejected after serving their purpose to prevent malfunction of the jet nozzle.

An additional object of the invention is to provide a novel supersonic nozzle where there is assured positive control of proper jet nozzle area and configuration at all times.

Yet another object of this invention is to provide means for varying the cross sectional area of the engine exhaust nozzle to maintain optimum engine efficiency throughout the entire speed range.

Other objects and advantages of the invention will become readily apparent from the following description taken in conjunction with the accompanying drawings wherein:

Figs. 1 to 5 of the drawings schematically disclose the novel apparatus arrangement of the subject invention and its function from take-off of an aircraft to obtaining a cruising speed.

Fig. 7 is a view of the nozzle throat area taken on line 7—7 of Fig. 6a.

Figure 6:
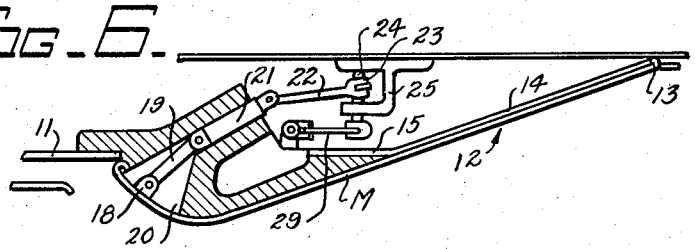
Fig. 6 is a partial cross sectional view showing the novel apparatus for varying the nozzle throat area with the nozzle throat in normal full open condition.
Figure 6A:
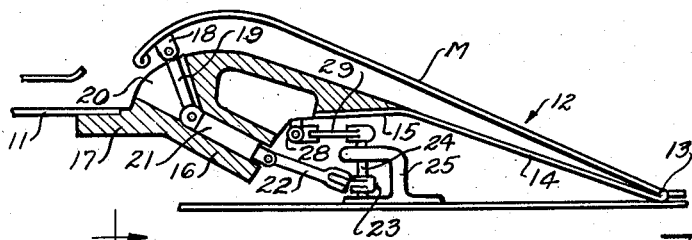
Fig. 6a is similar to Fig. 6 and shows the control apparatus when the throat of the nozzle is in position of reduced cross sectional area.
Figure 7:
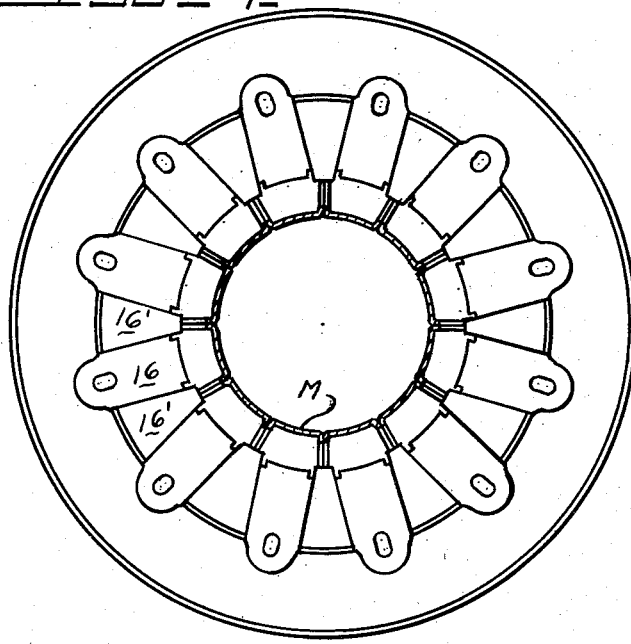
Figure 8:
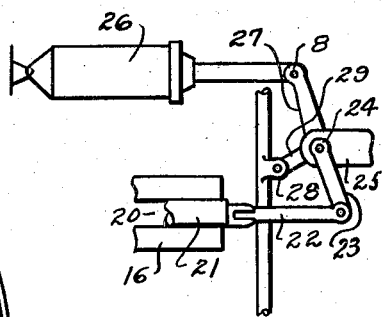
Fig. 8 is a detail showing of the nozzle throat control apparatus.

As seen generally schematically in Fig. 1 of the drawings the novel jet nozzle comprises a nozzle housing section 1, forming an extension of the reheat combustion section R connected to the turbine housing C of an engine. A nozzle extension 2 having a streamlined convergent outer conformation and a constant inner diameter is readily releasably connected as by a ring of explosive bolts, of which one bolt 35 is shown, to the nozzle housing 1, and a fixed convergent nozzle addition 3 is readily releasably connected as by a ring of explosive bolts, of which one bolt 36 is shown in Figs. 1 and 2, to the nozzle extension 2. The housing 1, extension 2 and fixed nozzle addition 3 have their outer surface faired to define a smooth continuous converging cross section to the outlet of the fixed nozzle addition 3 as shown in the drawings schematically. Extending centrally from the turbine housing is a modified tail cone 4 connected by struts 5 to the turbine housing C. The struts 5 are connected within the tail cone 4 at a fixed point 6. The tail cone 4 has its cross section converging towards the nozzle chamber and providing an annular lip. Seated on the annular lip 7 of the tail cone and readily releasably connected to the lip as by explosive bolts, of which one 37 is shown in Fig. 1, is a "bullet" 8 of suitable aerodynamic shape having fins 9 thereon for stabilizing means. Connected to the rear end of the "bullet" is a tape 10 extending from fixed point 6 to a reel 10' shown schematically, about which the tape is wrapped and which is operable to extend the tape. The upstream end of the tape is readily releasably connected, as by an explosive bolt 38, to the fixed point 6. A cylindrical housing wall section 11 of uniform diameter is provided in the reheat section R, within which a reheat combustor is located, and extends to a convergent-divergent inner wall section 12 which defines the variable throat portion of the nozzle. This variable inner wall section 12 as seen in Figs. 6, 6a and 7 of the drawings is formed of sheet metal strips M arranged annularly adjacent each other hinged at 13 to the outer end of a plate 14 secured in any suitable manner to the outer housing wall. The plate 14 is annular and is uniform at its inner portion 15 spaced from the outer housing wall and diverges uniformly therefrom to the outer housing wall. Secured to the portion 15 of the plate 14 as by bolts are a series of spaced blocks 16 separated by blocks 16', the blocks 16 being so designed that the outer surface thereof conforms to the convergent-divergent shape of the variable inner wall section 12 which abuts the plate 14 and blocks 16 in its normal extended position. It is to be noted that the sheet metal strips M are individual, hinged leaves of a wasp-waisted nozzle. When these leaves are in their contracted positions, their sides abut one another to define a composite tubular orifice of circular cross-section at each point of the nozzle length. When the leaves M are spread apart or expanded to their retracted positions against the blocks 16, the spaces between the sides of the leaves are spanned by the arcuate inner surfaces of the block 16'. The leaves and the spacer blocks 16' then form a tubular nozzle orifice of circular cross-section at each point of its length and of greater area than the nozzle orifice formed by the leaves alone when in their innermost, abutting positions shown in Fig. 7. There is an extension 17 of each block 16 that extends rearwardly beyond the inner end of a strip of wall section M to seat on wall section 11 and be fixed relative thereto. Connected to the inner surface of each strip of the wall section 12 is a hinge bracket 18 to which is pivoted a link 19 which extends through an enlarged portion of passage 20 through a block 16 and is connected by a pivot pin to rod 21 slidably mounted in passage 20. Another link 22 is pivoted at one end to rod 21 and at the other to a lever 23 secured to a crank rod 24 rotatably mounted in bracket 25 fixed to the outer housing wall. An actuator 26, which may be of any well-known type, is pivotally connected to lever 27 which is connected to crank rod 24 to crank the rod to move rod 21 and the metal strip M inwardly of the nozzle chamber and to return. A synchronizing ring 28 interconnects all strips by a similar link 29 clamped to each crank rod 24 and pivotally connected to the ring 28 so that as the actuator 26 is actuated, the crank rod 24 turns to turn the links 29 as they are interconnected to ring 28 to move all metal strips uniformly and simultaneously.

The explosive bolts 35, 36, 37, and 38 are of known construction such as, for example, disclosed in Patent No. 2,302,280 and may be exploded and disintegrated by any suitable circuit. Such circuit may include a distributor or timer or the like, here diagrammatically represented within a dotted box D by four switches a, b, c, and d. Upon closure of switch a, a circuit will be made from one side of a source of potential, here represented by a battery B, via the switch a, and through the explosive bolt 37, to the opposite side of the source of potential. When this circuit makes, it ignites explosive bolt 37 causing its disintegration, with consequent release of the "bullet" 8 from its retention at the intake end of the nozzle structure which may be considered as embracing the reheat chamber R. With "bullet" 8 now free of restraint the force of the exhaust or jet force within the nozzle structure is effective on the "bullet" to propel it outwardly to the position shown in Fig. 2. With the "bullet" 8 reeled out to this position, it serves to reduce the discharge area of the nozzle structure.

Closure of the switch b, in a manner now understood, completes a circuit through explosive bolt 38, thereby breaking the connection between tape 10 and the nozzle structure. Consequently, the jet stream is effective to completely expel and jettison the "bullet" 8. Similarly, the closure of switch c results in explosion of bolts 36, thus dismounting the nozzle addition or supplement 3 which is jettisoned by the jet stream. Likewise, then switch d is closed, it results in the explosion of bolts 35, enabling the jet force to jettison the nozzle extension of supplement 2.

It is to be noted that the reheat chamber R is of well-known construction such as disclosed, for example in Patent No. 2,551,229 or in Patent No. 2,677,233, or in Patent No. 2,674,843 and need not be illustrated in detail. Further the invention in the nozzle-area reducing means may be applied and have utility with nozzle structures whether or not such structures include a reheat chamber or afterburner.

It must be understood that turbojet powered airplanes and missiles for a wide range of subsonic and supersonic speed face a serious problem in the wide difference of required jet nozzle areas and configurations throughout the range of their required performance. For example, if the required shape of a nozzle for supersonic cruising speed of an aircraft at M=2.75 is a convergent-divergent shape having a predetermined throat area defined as 100% throat area, the other operational conditions of the aircraft require the following conditions as to the nozzle, the figures being approximate.

| Condition of aircraft | Reheat | Nozzle Configuration | Nozzle Throat Area, percent |
| --- | --- | --- | --- |
| a. take off | full | convergent | 140 |
| b. subsonic cruise | no | do | 80 |
| c. acceleration to M=1.5 | full | convergent divergent. | 150 |
| d. acceleration to M=2.75 | full | do | 150 |
| e. cruise at M=2.75 | partial | do | 100 |

With the application of the novel nozzle of the invention as can be seen there are no complex or bulky controls and the required nozzle control is simply effected as follows.

At take-off the elements are as in Fig. 1 of the drawings with the "bullet" 8 retracted to its mounting 7 and the metal strips M of the convergent-divergent throat retracted. The nozzle outlet area is then defined by the outlet of the nozzle addition 3 as 140% relative to the required area at cruising.

At subsonic cruise the "bullet" 8 is reeled out, in the manner described above, as a result of the closure of switch a to explode the restraining, explosive bolts 37 (Fig. 1). The "bullet" due to its stabilized nature and its aerodynamic shape will position itself in the air flow centrally of the outlet of nozzle addition 3 to reduce the nozzle area to 80%. The tape 10, of course connected to the "bullet" 8 is of heat resistant material. This positioning to reduce the nozzle area is possible because at subsonic cruise the gas temperature is moderate and the afterburner is inoperative.

During acceleration to M=1.5, the tape and the "bullet" are jettisoned, in the manner explained, as a result of the closure of switch b (Fig. 1) to cause explosion and disintegration of bolt 38. At the proper M (Mach) number, the nozzle component 3 also is jettisoned, in the manner explained, as a result of the closure of switch c to produce the explosion of bolts 36. Resultingly the nozzle area of the convergent-divergent nozzle by the use of the nozzle extension 2 defining the outlet provides the moderate expansion ratio and a nozzle throat area of 150%.

In accelerating to M=2.75 the nozzle extension 2 is jettisoned, in the manner explained, as a result of the explosion and disintegration of the bolts 35 by the circuit made upon closure of switch d. In the transition speed range from 1.5 to 2.75 the nozzle flow pattern gradually approaches the correct configuration which is reached at 2.75 with little loss of efficiency in the process. The throat area and expansion is correct for M=2.75. At M=2.75 at supersonic cruise a 100% throat area is necessary. Accordingly by actuation of the actuator 26, the metal strips are moved conjointly inwardly to reduce the throat area to 100% for proper performance, the conjoint movement being effected by the synchronizing ring in a manner which is obvious to move the rods and links connected to the metal strips and accordingly the metal strips. It is, of course, understood that the actuating mechanism for the nozzle throat can be continuously varied throughout the entire speed range so that in cooperation with the outermost nozzle element attached to the engine the cross sectional area of the exhaust nozzle will provide optimum engine efficiency at all engine speeds.

By this novel structure of the invention the nozzle area and shape corresponds exactly to the requirement at supersonic cruising speed. Also under the conditions of take-off and subsonic cruising speed of an aircraft the exact requirements of the nozzle at take-off are met by a nozzle addition of predetermined shape and area which is jettisonable when required and the controllable "bullet" enables exact reduction of the nozzle area for subsonic cruise and these inexpensive jettisonable items made of sheet metal are easily expendable having performed their function. The basic nozzle and extensions cooperate to effect a highly satisfactory compromise in reaching supersonic cruising speed.

The nozzle throat variable control structure including sheet metal leaves M, their control linkage 19, 21, 22, 23, 24, 27, 28, 29, the actuator 26, etc. presents an advance in the art since the control linkage is well protected being substantially within its support blocks 16 and spacer blocks 16', all these blocks being preferably made of heat resistant graphite or sweat cooled sinter material and no movable parts are exposed to extreme heat since the link 19 connected to the metal plates is exposed only at supersonic cruising speed which is a condition of moderate gas temperatures.

It is to be noted that the means for actuating the explosive bolts 35, 36, 37, and 38 and the actuator 26 for the metal strips M can be any suitable means appropriate to the purposes of the invention.

While the novel nozzle throat control apparatus and novel jettisonable nozzle apparatus are both incorporated in a single practical embodiment herein for purposes of illustration of the distinct advance in the art each concept presents within itself a major advance and may be used separately as well as in combination depending on the application desired and such separate use is within the scope of this invention.

While a particular practical embodiment of the invention is shown herein such an embodiment as shown is for purposes of illustration only and many other modifications and applications of the invention will be readily apparent therefrom to those versed in the art and such are considered to be within the scope of the invention as defined by the appended claims.

I claim:

1. In a jet engine propulsion system having a tailpipe with an afterburner positioned therein; a means for varying the discharge nozzle area of the tailpipe to conform with various flight conditions comprising an adjustable convergent-divergent nozzle positioned at the exit of the afterburner section in the tailpipe, said adjustable nozzle having radially movable elements for varying the throat area of the nozzle and actuating means for moving the nozzle elements, a cylindrical section forming a tailpipe extension and the inner end thereof being positioned adjacent the throat of said adjustable nozzle overlying and rendering ineffective the major portion of the divergent section of the adjustable nozzle, a separable convergent nozzle secured to the outlet of said cylindrical section, means for disconnecting and jettisoning the convergent nozzle during flight operation from said cylindrical tailpipe extension and further means for subsequently disconnecting the cylindrical tailpipe extension from its support and jettisoning the same during flight operation to thereby render said convergent-divergent nozzle solely effective to vary the tailpipe discharge area.

2. In a jet engine propulsion system having a tailpipe with an afterburner positioned therein; a means for varying the discharge nozzle area of the tailpipe to conform with various flight conditions comprising an adjustable convergent-divergent nozzle positioned at the exit of the afterburner section in the tailpipe, said adjustable nozzle having radially movable elements for varying the throat area of the nozzle and actuating means for moving the nozzle elements, a cylindrical section forming a tailpipe extension and the inner end thereof being positioned adjacent the throat of said adjustable nozzle overlying and rendering ineffective the major portion of the divergent section of the adjustable nozzle, a separable convergent nozzle secured to the outlet of said cylindrical section, a streamlined body positioned in the tailpipe forward of the afterburner section, said streamlined body having stabilizing surfaces enabling it to remain centered with respect to the jet flow through the tailpipe, means for moving the streamlined body from its initial position to a position within the convergent nozzle outlet of the tailpipe extension to reduce the nozzle cross sectional area to a minimum, means for jettisoning the streamlined flow constricting body during flight operation, means for disconnecting and jettisoning the convergent nozzle during flight from said cylindrical tailpipe extension and further means for subsequently disconnecting the cylindrical tailpipe extension from its support and jettisoning the same during flight operation to thereafter render said adjustable convergent-divergent nozzle solely effective to vary the tailpipe discharge area.

References Cited in the file of this patent

UNITED STATES PATENTS

| Number | Name | Date |
|---|---|---|
| 2,460,289 | Hickman | Feb. 1, 1949 |
| 2,489,984 | Shoemaker | Nov. 29, 1949 |
| 2,557,435 | Imbert | June 19, 1951 |
| 2,570,629 | Anxionnaz et al. | Oct. 9, 1951 |
| 2,596,644 | Bradford et al. | May 13, 1952 |
| 2,625,008 | Crook | Jan. 13, 1953 |
| 2,634,578 | Kallal | Apr. 14, 1953 |
| 2,641,104 | Estabrook | June 9, 1953 |
| 2,654,320 | Schmid | Oct. 6, 1953 |
| 2,669,834 | Helms | Feb. 23, 1954 |
| 2,682,147 | Ferris | June 29, 1954 |
| 2,686,473 | Vogel | Aug. 17, 1954 |
| 2,705,863 | Clark et al. | Apr. 12, 1955 |
| 2,766,581 | Welsh | Oct. 16, 1956 |

FOREIGN PATENTS

| Number | Country | Date |
|---|---|---|
| 694,019 | Germany | July 24, 1940 |